United States Patent
Elazary et al.

(10) Patent No.: US 11,257,033 B2
(45) Date of Patent: Feb. 22, 2022

(54) INVENTORY VERIFICATION DEVICE

(71) Applicant: inVia Robotics, Inc., Westlake Village, CA (US)

(72) Inventors: Lior Elazary, Agoura Hills, CA (US); Randolph Charles Voorhies, Culver City, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 0 days.

(21) Appl. No.: 16/786,031

(22) Filed: Feb. 10, 2020

(65) Prior Publication Data

US 2020/0175466 A1   Jun. 4, 2020

Related U.S. Application Data

(63) Continuation of application No. 16/113,536, filed on Aug. 27, 2018, now Pat. No. 10,558,944.

(51) Int. Cl.
*G06Q 10/08* (2012.01)
*G06K 7/10* (2006.01)

(52) U.S. Cl.
CPC ....... *G06Q 10/087* (2013.01); *G06K 7/10128* (2013.01)

(58) Field of Classification Search
CPC .......................... G06Q 10/087; G06K 7/10128
See application file for complete search history.

(56) References Cited

U.S. PATENT DOCUMENTS

| | | | |
|---|---|---|---|
| 6,779,722 B1* | 8/2004 | Mason | A47F 9/046 235/375 |
| 2006/0239678 A1* | 10/2006 | Itzkowitz | F16M 11/2014 396/419 |
| 2012/0030070 A1* | 2/2012 | Keller | G06Q 10/087 705/28 |
| 2015/0262346 A1* | 9/2015 | Horita | H04N 5/23222 348/137 |
| 2018/0032949 A1* | 2/2018 | Galluzzo | B25J 11/00 |
| 2018/0370046 A1* | 12/2018 | Hance | B25J 19/023 |

\* cited by examiner

*Primary Examiner* — Matthew Mikels
(74) *Attorney, Agent, or Firm* — Ansari Katiraei LLP; Arman Katiraei; Sadiq Ansari

(57) ABSTRACT

An inventory verification device ("IVD") provides automatic inventory verification and detection of inventory discrepancies. The IVD automatically verifies the quantity of items in a container based on weight and/or height measurements obtained for the items in the container using two or more sensors of the IVD. The IVD may also automatically updated tracked inventory of an item based on detected changes to the weight and/or height of the items in the container as a result of a worker adding items to the container or removing items from the container without the working providing confirmation for each addition and/or removal. The IVD autoatmically verifies whether correct items are stored in a container by performing feature matching of various characteristics for items imaged in the container against expected characteristics for items that should be stored in the container.

17 Claims, 8 Drawing Sheets

INVENTORY VERIFICATION DEVICE

CLAIM OF BENEFIT TO RELATED APPLICATIONS

This application is a continuation of U.S. nonprovisional application Ser. No. 16/113,536 entitled "Inventory Verification Device", filed Aug. 27, 2018, now U.S. Pat. No. 10,558,944. The contents of application Ser. No. 16/113,536 are hereby incorporated by reference.

BACKGROUND INFORMATION

Inventory management may involve accurately tracking quantity, location, and/or other characteristics of stored items. Improper inventory management can lead to improper order fulfillment, delayed order fulfillment, and additional costs.

Inventory discrepancies may occur as a result of replenishing a first container containing a first item with one or more units of an incorrect second item. A customer order for the first item may then be incorrectly filled with one or more units of the second item from the first container. Also, time and resources may be wasted detecting and correcting the item misplacement.

Inventory discrepancies may also occur as a result of placing the first container in an incorrect storage location, and placing a different second container in an expected storage location of the first container. A customer order for the first item may then be incorrectly filled as a result of retrieving the second container with one or more other items instead of the first container because of the container misplacement. Here again, time and resources may be wasted detecting and correcting the container misplacement.

Inventory discrepancies may also result from improper tracking of item quantity. For instance, a quantity of a first item may not be decremented when one or more units of the first item are used to fulfill a customer order, or when one or more units of the first item are damaged, lost, stolen, misplaced, or are incorrectly counted to begin with. When a customer order for the first item is received, actual inventory of the first item may be less than the expected inventory which may lead to having an insufficient quantity on hand to fulfill a customer order.

DETAILED DESCRIPTION OF PREFERRED EMBODIMENTS

Systems and methods, as presented herein, provide an inventory verification device ("IVD") for automatically verifying multiple characteristics of inventory, and for detecting inventory discrepancies based on the multiple characteristics. The IVD may verify inventory and/or detect inventory discrepancies when a specific item or an item container is accessed. Specifically, the IVD may be used for inventory verification at any point when the specific item or the item container is manipulated or moved. The item container may be a tote, box, or other storage unit for storing one or more units of one or more items.

In some embodiments, the IVD may be used to reduce or eliminate inventory discrepancies that may occur during an order fulfillment process or a storage process. For instance, the IVD may be used to verify correct retrieval of a container by a robot and/or human as well as various characteristics of the items in the container as part of fulfilling a customer order for one or more units of the items.

The IVD may also update tracked inventory based on the verified characteristics as the inventory is accessed. The updates may facilitate item replenishment, inventory optimization via item and/or container repositioning, and/or other inventory management functions.

The IVD may include multiple sensors. One or more sensors of the IVD may be used to verify one or more characteristics of an item, items within a container, and/or other objects positioned before the IVD. For instance, the IVD sensors may be used to verify that an accessed container stores a correct quantity and/or an allocation of items.

Figure 1:
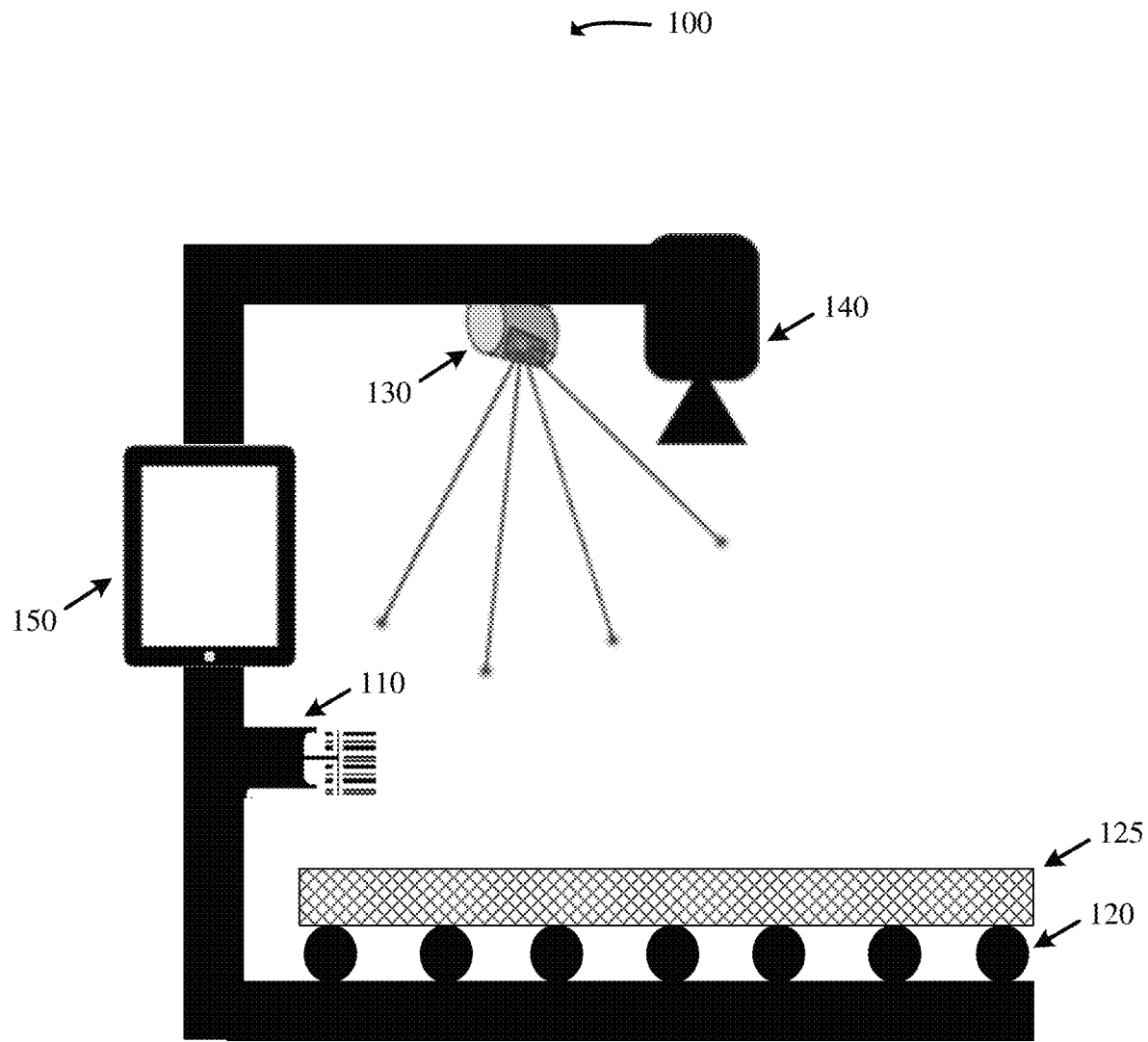
FIG. 1 illustrates an inventory verification device ("IVD") in accordance with some embodiments described herein.

FIG. 1 illustrates IVD 100 in accordance with some embodiments described herein. As shown, IVD 100 may include sensors 110, 120, 130, and 140, and display 150. Sensors 110, 120, 130, and 140 are an example set of sensors that may be used by IVD 100 for automated inventory verification and/or discrepancy detection. In some embodiments, IVD 100 may include additional or alternate sensors. The placement of sensors 110, 120, 130, and 140 on IVD 100 may also be different than what is shown in FIG. 1 in some embodiments.

Sensor 110 may include a scanner or a barcode, Quick Response ("QR") code, or other fiducial reader. Sensor 110 may detect and read an identifier positioned about a sidewall or outer surface of a container positioned before IVD 100. For instance, each container in warehouse may have an identifier on the outside of a front wall. The identifier may be code or other value that uniquely identifies the container and/or its content from other containers or content.

IVD 100 may obtain various information about the container and/or items stored in the container based on the identifier obtained from sensor 110. In some embodiments, IVD 100 may query local memory or storage using the identifier to obtain information about the container and items stored in the container. In some embodiments, IVD 100 may include a wireless radio to communicate the identifier to an inventory management system ("IMS") that then retrieves the information about the container and items stored in the container. The IMS may provide the retrieved information to IVD 100 via the wireless radio.

The information that can be retrieved based on the container identifier may include a last tracked quantity or expected quantity of items within the container, and characteristics of the items in the container. The characteristics may include item weight, color, size (e.g., height, weight, length, and/or other dimensions), item visual features, and/or other item properties. The obtained information may also be used to verify that a correct container was retrieved and/or the correct container was stored at a storage location. For instance, a worker may be tasked with retrieving a first container containing a set of first items from a storage location. The worker retrieves a container from the storage location, and may place the retrieved container before IVD 100. Sensor 110 may scan an identifier from the retrieved container, and IVD 100 may retrieve information identifying a second container containing a second of second items. In doing so, IVD 100 verifies that the wrong container is stored in the expected location of the first container, or that the worker selected a container from an incorrect location.

Sensor 120 may include one or more load cells that are attached to and/or underneath platform 125 upon which a container, item, or other object may be placed. Sensor 120, via the load cells, may measure the weight of the container, item, or other object placed atop platform 125. The load cells may account for the weight of a container in order to weigh only the contents within the container. For instance, container information, obtained from scanning the container identifier with sensor 110, may indicate a weight of the container when the container is empty so that the weight measurement obtained using sensor 120 can be reduced by the weight of the empty container.

Measurements obtained by sensor 120 can be used for tracking the quantity of items in the measured container. For instance, sensor 110 may scan the identifier on the outside of a container, and IVD 100 may obtain a weight for one of several units of the same item stored in the container based on the container identifier. IVD 100 may then divide the measured weight of the container content (e.g., total measured weight less the weight of the container when empty) by the individual item weight in order to determine the quantity of items in the container. IVD 100 may also compare the quantity derived from the weight measurement against an expected quantity, obtained based on the scanned identifier, to determine if there is an inventory tracking discrepancy that should be investigated further. In some embodiments, IVD 100 may detect a change in quantity by comparing a current weight of the container to a last tracked weight for the same container. If there is a difference between the measured weights, then one or more items may have been removed or added to the container since the last tracked weight measurement.

Sensor 130 may include a distance sensor for measuring distance of an object from sensor 130. Sensor 130 may use light, lasers, LIDAR (light imaging, detecting, and ranging), radar, sound, electromagnetic fields, waves, and/or other signaling to obtain the distance measurement. In some embodiments, sensor 130 may be elevated over a container that is placed before IVD 100 via a fixed or adjustable bracket. The bracket may dispose sensor 130 downwards over a top opening of the container. Through the top opening, sensor 130 may detect the height of the items that are stored in the container. Sensor 130 may have other orientations depending on which side of the container is open or how the items in the container are arranged.

The distance measurements obtained by sensor 130 can be used, similar to the weight measurements obtained via sensor 120, to determine the quantity of items in the container. In some embodiments, sensor 130 is used to determine item quantity when the items in the container are vertically stacked in one or more columns. For instance, sensor 110 may scan the identifier on the outside of a container, and IVD 100 may obtain a height for one of several units of the same item in the container based on the container identifier. IVD 100 may then determine the quantity of items in the container based on a distance from sensor 130 to platform 125, the height of an individual item (e.g., an item characteristic), and the measured distance from sensor 130 to a topmost item in the container. In some embodiments, the item quantity derived from distance measurements taken by sensor 130 may be used to verify the item quantity derived from weight measurements taken by sensor 120. IVD 100 may also compare the quantity derived from the distance measurement against an expected quantity, obtained based on the scanned identifier, to determine if there is an inventory tracking discrepancy that should be investigated further. IVD 100 may also compare a current height measurement for a container against a previous height measurement taken for the same container to detect a difference in quantity. In some embodiments, IVD 100 wirelessly communicates the height measurements to the remote IMS for quantity verification by the IMS on behalf of IVD 100.

Sensor 140 may include a traditional two-dimensional ("2D") camera and/or three-dimensional ("3D") camera that captures images of one or more items in a container placed before IVD 100. Sensor 140 may also be vertically mounted on a bracket that disposes sensor 140 downward over a top opening of the container. IVD 100 may provide the images to the remote IMS for feature matching or may locally perform the feature matching based on characteristics of items expected to be in the container. The feature matching identifies item discrepancies in the container based on mismatched characteristics, such as color, shape, size, and/or other properties, for actual imaged items in the containers and expected items that are linked to the container and/or the scanned container identifier.

Sensor 140 may be used to verify that a correct item is in the container, and that the item has correct features. For instance, a container may contain one or more red shirts. Feature matching via sensor 140 captured images may identify other clothing in the container or a blue shirt that was incorrectly placed in the container amongst the red shirts. Thus, even though the actual quantity matches the expected quantity based on weight measurements by sensor 120 and/or distance measurements by sensor 130, sensor 140 may be used to detect other discrepancies such as mismatched items being placed in the same container.

As a 3D camera, sensor 140 may produce a 3D image of the container contents. In addition to verifying contents of the container, the 3D image can be processed to verify item quantity depending on the type and form of items within the container.

Display 150 may provide output. The output may indicate that IVD 100 has detected one or more discrepancies including a wrong quantity and/or incorrect item placement. The output may also present users with expected characteristics for a container identified via sensor 110. For instance, display 150 may present a last tracked quantity of items in the container, as well as various visual characteristics for the items that are should be stored in the container. The user can then verify, alongside IVD 100, quantity and/or item allocation.

Display 150 may also provide one or more inputs with which a human can directly interact with IVD 100. Display 150 may include a touchscreen and/or buttons. In some embodiments, display 150 may provide instructions for a user to follow and the user acknowledges the instructions by providing input via display 150.

Figure 2:
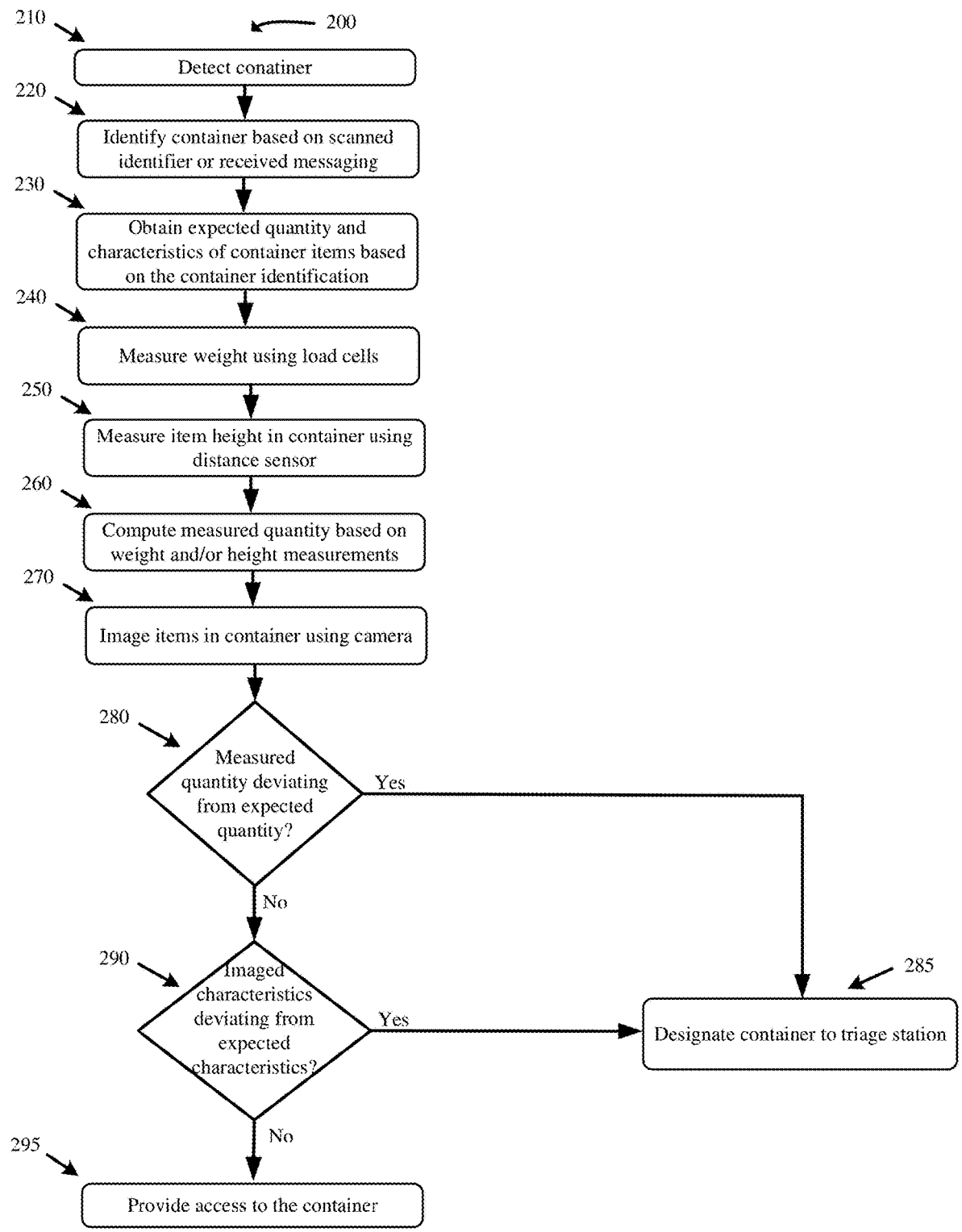
FIG. 2 presents a process by which the IVD automatically verifies inventory and detects inventory discrepancies in accordance with some embodiments described herein.

IVD 100 may use one or more of sensors 110, 120, 130, and 140, and may operate independently or in conjunction with a remote IMS, to automatically verify inventory and detect inventory discrepancies. The inventory verification and discrepancy detection may be performed as containers are accessed to ensure that customer orders are correctly fulfilled, and to ensure that the tracked inventory is correct and updated in real-time. FIG. 2 presents process 200 by which IVD 100 automatically verifies inventory and detects inventory discrepancies in accordance with some embodiments described herein.

Process 200 may include detecting (at 210) a container that is placed before IVD 100 using one or more of sensors 110, 120, 130, and 140. For instance, the load cells of sensor 120 may detect placement of a container on platform 125 in response to measuring a threshold amount of weight with sensor 120. In this case, the threshold amount of weight detected by sensor 120 serves as a trigger to cause sensor 110 to scan a container identifier. Alternatively, or additionally, the scanner of sensor 110, the distance sensor of sensor 130, and/or the camera of sensor 140 may independently or collectively detect when a container is placed before IVD 100, and may trigger the reading of a container identifier with sensor 110.

Process 200 may include identifying (at 220) the container by scanning an identifier on the container using sensor 110 and/or by wirelessly receiving messaging about the container. For instance, sensor 110 may scan a barcode, QR code, or another fiducial located on the outside of the container. Alternatively, a robot or human that delivers the container to IVD 100 may have a wireless radio to provide an identifier associated with the container to IVD 100. For instance, the robot or human may use a scanner to scan an identifier associated with the container when initially retrieving the container from a storage location or elsewhere. When the robot or human delivers the container to IVD 100, the robot or device used by the human may wirelessly transfer the scanned identifier and/or other information obtained from the identifier to IVD 100.

Process 200 may include obtaining (at 230) an expected or last tracked quantity and/or various characteristics of items in the detected contained based on the container identification. As noted above, IVD 100 may provide the scanned container identifier to the remote IMS, and the IMS returns information about the items in the container to IVD 100 via a wireless radio. For instance, the IMS may provide the last tracked or expected quantity of items in the container or a last tracked weight and/or height measurement for the items in the container. The IMS may also provide the weight, color, size (e.g., height, weight, length, and/or other dimensions), visual features, and/or other properties for the items that should be found in the container. Typically, a container is used to store multiple units of the same item. However, some containers may vary one or more of the characteristics of the items in a container. For example, one container may store only white shirts that are a uniform size, and another container may store shirts of different colors and/or different sizes (e.g., small, medium, and large). In any case, the IMS may track the characteristics for the expected items in the container, and may provide the tracked characteristics to IVD 100 in response to IVD 100 detecting (at 210) and identifying (at 220) the container. In some embodiments, IVD 100 may operate independent of the IMS, and may store the expected quantity and item characteristics for different containers in memory.

Process 200 may verify the container items by comparing the obtained (at 230) characteristics against measurements of sensors 120, 130, and/or 140. In particular, IVD 100 may use weight and height measurements to verify the expected quantity of items in the container. IVD 100 may also use image feature matching to verify that the characteristics of the items in the container match with characteristics of correct items that are expected to be in the container.

To perform the verification, process 200 may include measuring (at 240) the weight of the container using the load cells of sensor 120, and/or measuring (at 250) the height of the items stored in the container using distance sensor 130. In some embodiments, IVD 100 may measure the item height when the detected container has an open top side, and the items in the container are vertically stacked in one or more columns.

Process 200 may then include computing (at 260) at least a quantity of the items stored in the container based on the weight and height measurements. For instance, one of the characteristics obtained (at 230) for the identified container may be the weight of the container when empty, and/or the weight of an individual item stored in the container. IVD 100 may reduce the measured (at 240) total weight of the container by the weight of the empty container in order to obtain a weight for just the items in the container. IVD 100 may then divide the measured total item weight by the weight of an individual item to obtain a first quantity measurement for the items stored in the container. Assume that the obtained characteristic for the individual weight of an item in the container is 1 kilogram ("kg"), the obtained characteristic for the weight of the container when empty is 0.5 kg, and the total measured weight, obtained by sensor 120, for the container is 9.5 kg. In this example, IVD 100 may determine that the container stores 9 units of the item as a result of reducing the total measured weight (e.g., 9.5 kg) by the empty container weight (e.g., 0.5 kg) and then dividing the result by the individual item weight (e.g., (9.5−0.5)/1).

Similarly, one of the characteristics obtained (at 230) for the identified container may be the height of the individual item stored in the container. IVD 100 may then divide the measured (at 250) height by the height of an individual item to obtain a second quantity measurement for the items stored in the container. In some embodiments, IVD 100 may provide the obtained weight and height measurements to the remote system, and the remote system may perform the quantity verification and the associated computations on behalf of IVD 100.

Process 200 may also include imaging (at 270) the items in the container using the camera of sensor 140. The imaging may include taking one or more pictures of the items in the container from an open side (e.g., top side) of the container. The pictures capture item coloring, size, packaging, and/or other visual characteristics of the actual items in the container. A 3D camera may also capture shape and/or dimensions of the items.

Process 200 may verify item quantity based the quantity measurement derived from the weight and/or height measurements deviating (at 280) or matching to the expected quantity characteristic for the items in the identified container by a threshold amount. In some embodiments, the characteristics obtained (at 230) for the identified container may also provide a last weight and/or height measurement taken for the items in the container. In some such embodiments, IVD 100 may detect quantity deviation based on the measured (at 240) weight and the measured (at 250) height deviating by a threshold amount from the last weight and height measurements.

In response to the quantity measurement deviating (at 280—Yes) from the expected quantity characteristic by the threshold amount, process 200 may include designating (at 285) the container for inspection at a triage station. The threshold amount may be based on the accuracy of the quantity measurement derived from the weight and height measurements, and the amount of allowable deviation.

Designating (at 285) a container for inspection may temporarily make the container and its contained items unavailable for order fulfillment. In some embodiments, the designation changes the delivery destination of the container. Rather than a robot or human delivering the container to an order fulfillment station or a storage location, the robot or human may be instructed to deliver the container to a different destination (e.g., the triage station) where the container contents can be inspected. In some embodiments, IVD 100 may directly provide the instruction to a human via display 150, or may directly provide the instruction to a device carried by the human or a robot via wireless messaging. In some other embodiments, IVD 100 may provide messaging to the IMS, and the IMS may instruct the human and/or robot to move the container to a new destination.

The triage station may be a location in a warehouse where inventory discrepancies are corrected. For instance, a robot or human, at the triage station, may inspect the container content to determine the reason for the quantity discrepancy (e.g., items were stolen, lost, improperly counted, placed in an incorrect location/container, moved and not recorded, etc.). In some embodiments, the designation (at 285) may allow the container to be used to fulfill a current set of orders for items stored by the container, but the agent performing the order fulfillment may be notified of the discrepancy associated with the container in order to pay additional attention when handling items of the container. The container may then be delivered to the triage station for inspection. The inspection may also be performed by the agent at the order fulfillment station. For instance, the agent may verify that the quantity mismatch when removing some quantity of items from the container in order to fulfill a customer order. The container may then be delivered to a triage station in order for another agent to correct the discrepancy.

In some embodiments, the robot or human delivering the container to IVD 100 may perform the triage operations while the container remains at IVD 100. In some such embodiments, display 150 may identify the detected discrepancy, and provide one or more instructions for the robot or human to correct the discrepancy. In some embodiments, IVD 100 may directly message the robot or a device carried by the human with updated tasks related to designating (at 285) the container to the triage station. In some embodiments, the IMS may generate and provide to the robot or device of the human, the messaging for designating (at 285) the container to the triage station.

In response to the quantity measurement not deviating (at 280—No) from the expected quantity characteristic by the threshold amount, process 200 may proceed to verify other characteristics of the items in the container. For instance, process 200 may include determining (at 290) whether one or more characteristics of the items in the container, obtained from the captured images, deviate from expected characteristics for the items in the container. In some embodiments, IVD 100 may locally perform feature matching to determine whether the images that were captured by sensor 140 contain the expected characteristics. In some other embodiments, IVD 100 may provide the captured images to the IMS with an identification of the detected container, and the IMS performs the feature matching on behalf of IVD 100. The feature matching may include processing the captured images to determine (at 290) if item coloring, size, packaging, dimensions, and/or other visual characteristics from the captured images match to expected coloring, size, packaging, dimensions, and/or other visual characteristics for items that are expected to be in the container.

In response to determining (at 290—Yes) that the imaged characteristics deviate from the expected characteristics by a threshold amount, process 200 may include designating (at 285) the container to the triage station. For example, a mismatch between the coloring of one or more items captured in the images of the container and expected coloring for items in the container may indicate that the one or more items were incorrectly placed in the container and should be placed in a different container. A mismatch between the shape or size of one or more items captured in the images of the container and expected shape or size for items in the container may indicate that the one or more items have been damaged, were incorrectly placed in the container, or that the items or their corresponding packaging have been updated. The threshold amount for the characteristic deviation may be based on the number of detected mismatches or discrepancies and/or the scope of the deviation. At the triage station, the discrepancies may be corrected by a robot or human removing the incorrectly placed or damaged items from the container, and updating the stored quantity and other characteristics for the items in the container.

In response to determining (at 290—No) that the imaged characteristics do not deviate from the expected characteristics by the threshold amount, process 200 may include providing (at 295) access to the container. Providing (at 295) access may include instructing a robot or human to deliver the container to an order fulfillment station where a customer order for one or more items stored in the container can be fulfilled. Providing (at 295) access may also include instructing a robot or human to return the container to a particular storage location. In some embodiments, IVD 100 may also update the quantity and/or other characteristics associated with the items stored in the container. For instance, IVD 100 may notify the remote system that the quantity of items in the container have been verified at a particular time, and one or more images may be stored to record the contents of the content. These updates can later be used to diagnose discrepancies that occur with this or other containers.

Figure 3:
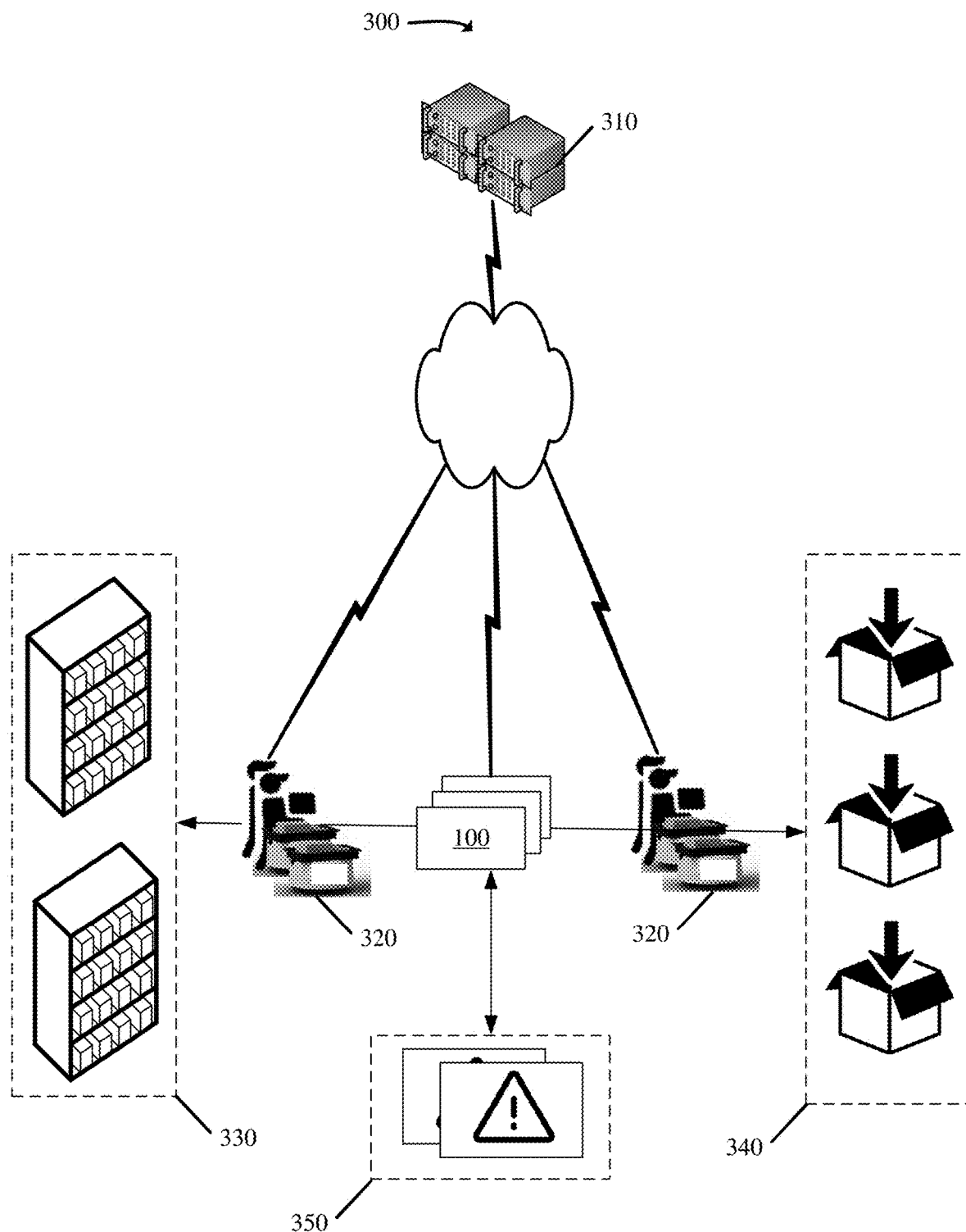
FIG. 3 presents an example environment for the automated inventory verification and discrepancy detection in accordance with some embodiments described herein.

FIG. 3 presents example environment 300 for the automated inventory verification and discrepancy detection in accordance with some embodiments described herein. Environment 300 includes one or move IVDs 100, IMS 310, one or more workers 320, one or more storage locations 330, one or more order fulfillment stations 340, and one or more triage stations 350.

IVDs 100 may be distributed throughout a site within various pathways to order fulfillment stations 340. In some embodiments, IVDs 100 may be integrated or placed at storage locations 330, order fulfillment stations 340, and/or as part of workers 320 (e.g., integrated as part of a robot worker). Each IVD 100 may automatically verify inventory of a container and detect various discrepancies associated with container inventory when that container is accessed. A container may be accessed when it is retrieved from storage locations 330, order fulfillment stations 340, triage station 350, and/or is otherwise manipulated or moved within the site.

Various components of IVD 100 were illustrated and described above with reference to FIG. 1. In some embodiments, each IVD 100 may further include a processor, memory, storage, and wireless network connectivity. In some embodiments, the memory and/or storage may store last tracked quantities and expected characteristics for items in different containers. The memory and/or storage may also store weight, height, and other measurements obtained from sensors 110, 120, 130, and/or 140 of IVD 100. The processor may be used to compute quantities based on the obtained measurements, detect quantity discrepancies based on information stored to the memory or storage or information that is obtained from IMS 310, and/or perform feature matching in order to detect item discrepancies. These and other components of IVD 100 are further described below with reference to FIG. 8.

IVDs 100 may be communicably coupled to IMS 310 via a wireless network (e.g., WiFi, Long Term Evolution ("LTE"), Fifth Generation ("5G"), or other wireless networking technology). In some embodiments, IVDs 100 communicate with IMS 310 in order to obtain container information (e.g., expected quantities and/or characteristics for items in different container), or to provide updates to tracked inventory in response to verifying container inventory. In some embodiments, IVDs 100 communicate with IMS 310 by passing sensor data to IMS 310 so that IMS 310 may derive item quantity for a container from the obtained sensor measurements, and/or perform feature matching on behalf of IVDs 100 using images provided by one or more sensors of IVDs 100. In some such embodiments, IVDs 100 operate in conjunction with IMS 310 to perform the inventory verification and discrepancy detection.

IMS 310 may include one or more network accessible machines or servers with one or more processors, memory, storage, and/or network connectivity. IMS 310 may track inventory for the entire site by tracking which items and/or containers are at which storage locations 330 and which customer orders are to be fulfilled at which order fulfillment stations 340. IMS 310 may also instruct workers 320 on various tasks related order fulfillment and inventory management. For instance, IMS 310 may instruct a first worker to retrieve a first container from a first storage location, to verify contents of the first container using a first IVD along a path to a first order fulfillment station, and to deliver the first container to the first order fulfillment station once the first container contents are verified by the first IVD. Similarly, IMS 310 may instruct a second worker to retrieve a second container from a second order fulfillment station, to verify contents of the second container using a second IVD along a different path to a second storage location, and to deliver the second container to the second storage location once the second container contents are verified by the second IVD.

IMS 310 may be communicably coupled, via the wireless network, to workers 320 in order to provide the instruction to workers 320 and to coordinate their efforts. Workers 320 may include a set of autonomous robots. The autonomous robots may include various motors, actuators, and sensors to navigate within the site, retrieve containers, pick items from containers, package orders, and/or perform other tasks. The autonomous robots include wireless radios for communicating with IMS 310 and/or IVDs 100. Workers 320 may also include a set of humans. Each human may be outfitted with a device that can wirelessly communicate with IMS 310 and/or IVDs 100.

In some embodiments, IMS 310 performs a holistic inventory tracking based on information provided by IVDs 100 and workers 320. For instance, when a worker returns a container to a particular storage location, the worker may scan the container identifier as well as an identifier associated with the particular storage location, and provide the scans to IMS 310 to signal where the container is placed. Similarly, if a worker removes or adds one or more items to a container, the worker may scan each item and/or container to update IMS 310 that items have been removed or added.

However, workers 320 may incorrectly scan, forget to scan, or otherwise fail to correctly update inventory when removing or adding items and/or when placing containers. Accordingly, IVDs 100 provide automated inventory verification as the containers are accessed to identify and correct any errors that result from worker 320 error (e.g., human error or improper robot operation).

Accordingly, environment 300 illustrates a system for inventory tracking. Workers 320 may communicate with IMS 310 when one or more containers or items are accessed, IMS 310 may update its tracking of inventory accordingly, and IVDs 100 may verify the tracked inventory in real-time by corroborating inventory updates from workers 320 or by detecting discrepancies resulting from worker 320 updates. For instance, IVDs 100 may verify that a container contains a first quantity of items before the container is delivered to order fulfillment stations 340. IVDs 100 may report the first quantity for the container to IMS 310. One or more items may be removed from the container at order fulfillment stations 340 with each removal being scanned and reported to IMS 310 so IMS 310 can track an updated second quantity of items for the container. Before the container is returned to storage locations 330, IVDs 100 may again verify quantity and contents of the container. IVDs 100 may detect a discrepancy when the measured quantity differs from the second quantity tracked by IMS 310 as a result of reported removals at order fulfillment stations 340, or when items with unexpected characteristics are detected in the container. IMS 310 may update the tracked inventory for the container based on the detected discrepancy, or may signal a worker to deliver the container to triage stations 350 for inspection.

Storage locations 330 may include shelving to which containers, items, or other objects may be stored. Tracking the location of containers about storage locations 330 is critical for inventory management. IVDs 100 verify correct container placement by verifying that a container retrieved from a particular storage location contains the items from a container that is expected and/or tracked to be at the particular storage location.

Order fulfillment stations 340 may include destinations at which items from different containers are grouped to fulfill different customer orders. As noted above, IVDs 100 may be integrated or positioned at order fulfillment stations 340 to verify that workers 320 deliver the correct containers to the order fulfillment stations 340, to verify that the delivered containers contain the items with expected characteristics, and/or to verify or track removal of items from the containers during order fulfillment.

Triage stations 350 may be locations where containers with detected discrepancies may be placed in order to temporarily prevent access to those containers while workers 320 resolve the discrepancies. Triage stations 350 may be separate from storage locations 330 and order fulfillment stations 340, or may integrated as part of one or more storage locations 330 or order fulfillment stations 340.

Figure 4:
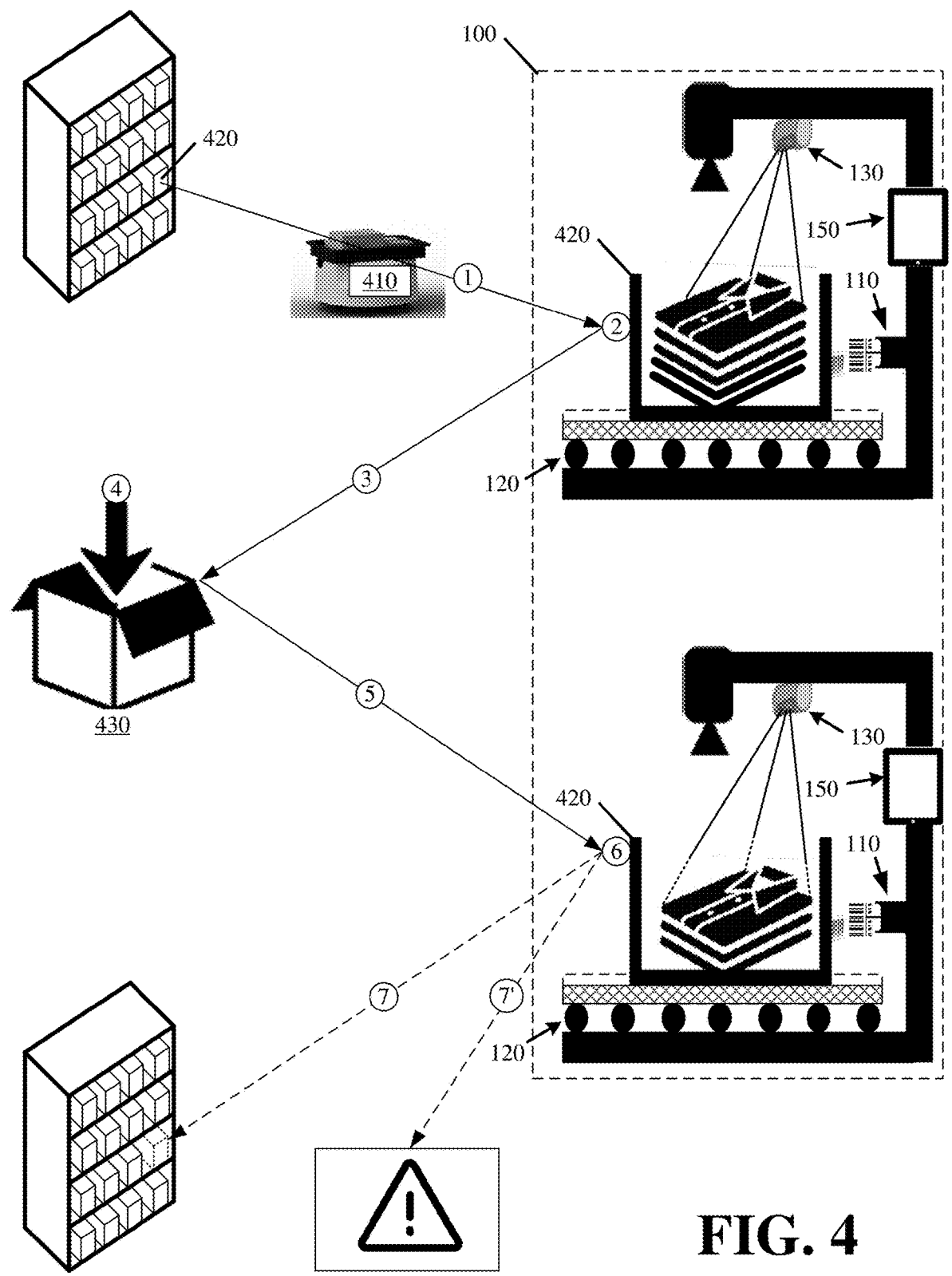
FIG. 4 illustrates an example of automated quantity verification of items in a container in accordance with some embodiments described herein

FIG. 4 illustrates an example of automated quantity verification of items in a container in accordance with some embodiments described herein. As shown, robot 410 retrieves (at 1) container 420 from a storage location, and delivers container 420 to IVD 100.

IVD 100 may scan (at 2) an identifier of container 420 using sensor 110. The scanned identifier is used to retrieve information and/or characteristics for the items in container 420. For instance, IVD 100 may obtain from IMS 310 (not shown in FIG. 4) information about a weight and a height for individual shirts stored in container 420. IVD 100 may also obtain a last tracked or expected quantity of items in container 420.

IVD 100 may obtain (at 2) a first set of weight and height measurements for items in container 420 using sensors 120 and 130. IVD 100 then computes (at 2) a quantity of shirts contained in container 420 by dividing the measured weight by the weight of an individual shirt, and/or by dividing the measured height by the height of an individual shirt. IVD 100 may store the derived quantity in association with the identifier of container 420, or may provide the derived quantity to IMS 310 to store in association with the identifier of container 420. In some embodiments, IVD 100 or IMS 310 may also or alternatively store the measured height and weight in association with the identifier of container 420. In some embodiments, IVD 100 may verify the quantity of shirts in container 420 by comparing the first set of weight and height measurements against previously tracked weight and height measurements for container 420 that may be obtained from IMS 310 based on the scanned identifier.

Robot 410 may then deliver (at 3) container 420 to order fulfillment station 430. At order fulfillment station 430, one or more units of the stored item may be retrieved (at 4) from container 420 in order to fulfill one or more customer orders. A worker scans each retrieved item to update the container inventory.

Robot 410 may bring container 420 back (at 5) to IVD 100 before returning container 420 into storage. Alternatively, robot 410 may bring container 420 back to IVD 100 at some other time for some other purpose.

IVD 100 scans (at 6) the identifier of container 420, and obtains information and/or characteristics for the items in container 420 from IMS 310. IVD 100 also obtains (at 6) a second set of weight and height measurements for the items in container 420 using sensors 120 and 130. The second set of weight and height measurements may specify the same or similar weight as the first set of weight and height measurements, but different height measurements. This may occur when the item weight is negligible. For instance, the load cells of sensor 120 may be unable to detect a sufficient difference to differentiate between a quantity of 100 hundred shirts in container 420 and a quantity of 99 shirts in container 420. However, by also measuring item height using sensor 430, IVD 100 may detect a change in the item quantity. IVD 100 may detect the change based on a difference between a current height measurement and the previous height measurement taken when robot 410 initially delivered (at 1) container 420 to IVD 100, or based on a quantity computed from the second set of weight and height measurements being mismatched with an expected or last tracked quantity that is associated with container 420 and that is retrieved using the scanned identifier.

If the quantity change is expected (e.g., the quantity change matches with the number of units removed (at 4) from container 420 at order fulfillment station 430), then IVD 100 may verify the contents of container 420, and may instruct robot 410 to return (at 7) container 410 back to storage. If the quantity change is unexpected (e.g., the quantity change does not match with the number of units removed (at 4) from container 420 at order fulfillment station 430), IVD 100 may log the discrepancy, and may designate (at 7') container 420 for triage. The discrepancy may arise if a worker at order fulfillment station 430 does not scan each item that is removed (at 4) from container 420 (e.g., worker removes two units but scans only one), an item falls out of container 420 during transit, one or more units are stolen, one or more other items are incorrectly placed in container 410, or other reasons.

Figure 5:
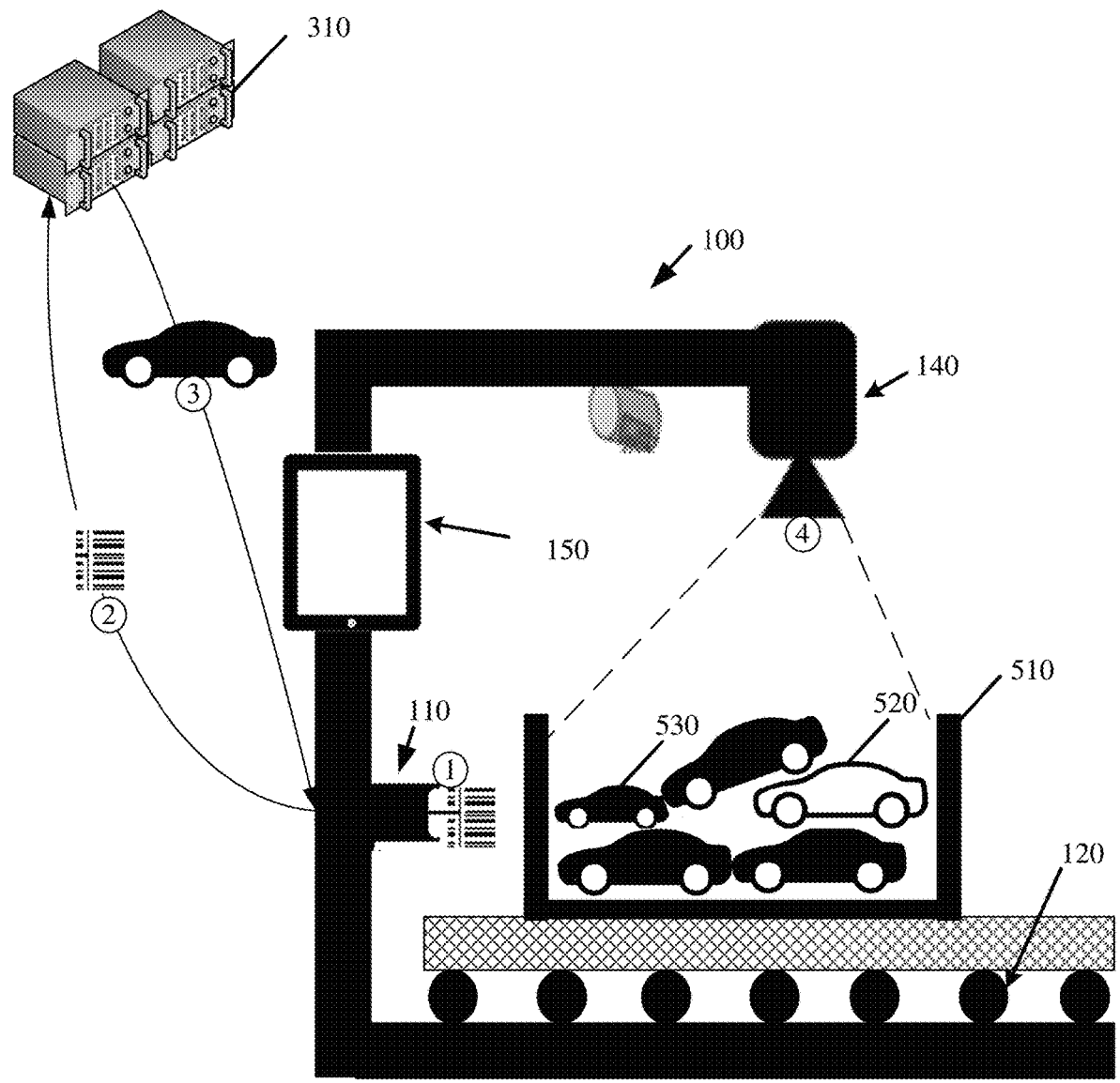
FIG. 5 illustrates an example of verifying items in a container based on their visual characteristics using one or more sensors of the IVD in accordance with some embodiments described herein.

FIG. 5 illustrates an example of verifying items in a container based on their visual characteristics using one or more sensors of IVD 100 in accordance with some embodiments described herein. In this figure, container 510 is placed before IVD 100.

IVD 100 may scan (at 1) an identifier of container 510 using sensor 110. IVD 100 wirelessly provides (at 2) the scanned identifier to IMS 310. In response, IMS 310 provides (at 3) information and/or characteristics for the items in container 510 to IVD 100. In this example, IVD 100 may obtain (at 3) information pertaining to the color, size, and/or other visual characteristics of the expected items in container 510.

IVD 100 may capture (at 4) one or more images of the items in container 510 using sensor 140. IVD 100, independently or in conjunction with IMS 310, may perform feature matching between visual characteristics found in the one or more images and the obtained (at 3) visual characteristics for the items in container 510. Based on the feature matching, IVD 100 may detect that container 510 includes one or more incorrect items 520 and 530, wherein incorrect items 520 and 530 are items that do not belong in container 510 and/or are associated with other containers. For instance, IVD 100 may detect that item 520 is of a different color (e.g., visual characteristic) than the expected items that should be stored in container 510. IVD 100 may also detect that item 530 is of a different size (e.g., visual characteristic) than the expected items that should be stored in container 510. The discrepancy in the container inventory may be due to a worker incorrectly placing items 520 and 530 in container 510 when replenishing, stocking, or returning items to container 510. In response to detecting the inventory discrepancy, IVD 100 may designate container 510 for further inspection, and may request a worker to remove container 510 from subsequent access until the discrepancy is resolved.

The discrepancy may also be detected and verified via sensors 120 and 130 of IVD 100. For instance, IVD 100 may detect that the measured weight of container 510 deviates from an expected weight because of the inclusion of item 520 and/or item 530. Similarly, the incorrect size of item 530 may cause the height measurement to deviate from an expected height.

In some embodiments, IVD 100 may include other sensors, in addition to or instead of sensors 110, 120, 130, and 140, to aid in the verification and discrepancy detection. For instance, IVD 100 may include an x-ray imager as sensor 130 or in addition to sensors 110-140. The x-ray imager may use electromagnetic radiation to obtain an image with an outline of the items in the container. The image may be processed to derive a quantity measurement. The image may also be processed to determine whether the items in the container have characteristics that match expected characteristics for items in the container. For instance, the x-ray imaging may identify discrepancies based on items that are of incorrect sizes or dimensions.

IVD 100 may also include a Radio-Frequency Identification ("RFID") sensor and/or reader in addition to or instead of sensors 110-140. The RFID sensor may emit electromagnetic fields to identify RFID tags that are attached to items in a container. The RFID sensor may therefore verify the quantity of items in a container by quick scanning and identifying the RFID tags of items in the container.

In some other embodiments, IVD 100 may include an enclosure into which a container is placed. IVD 100 may seal the enclosure, and may obtain a volume measurement based on air pressure within the chamber. In some such embodiments, IVD 100 may pressurize or depressurize the chamber for a more accurate air pressure reading. IVD 100 may determine contents of the container based on the measured volume and/or the weight measurement obtained from sensor 120.

As noted above, IVD 100 may be a standalone device that robots and/or humans may access when retrieving inventory, returning inventory, fulfilling orders, and/or performing other tasks involving the movement or accessing of inventory. In some such embodiments, IVD 100 may save time by detecting and reducing inventory-related errors, thereby ensuring that the tracked inventory reflects a correct location and quantity for stored items.

There may be some delay associated with delivering a container to a standalone IVD 100 before the container is delivered to an intended destination. To avoid such delays, in some embodiments, IVD 100 may be a device that is integrated as part of one or more robots and/or robotic or mechanical elements that perform inventory retrieval (e.g., transfer), inventory picking from storage locations, order fulfillment, and/or other functions where the inventory is manipulated.

Figure 6:
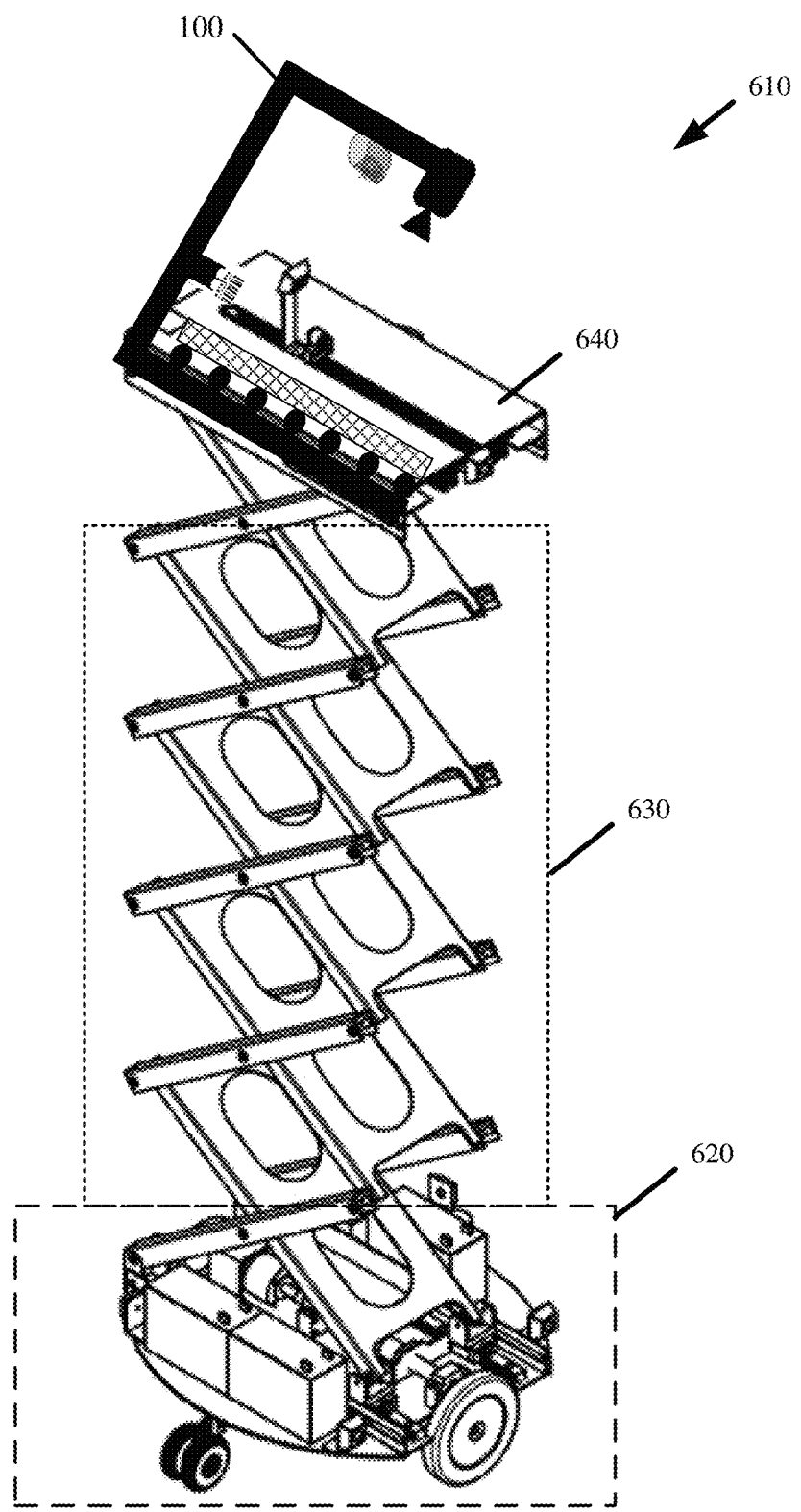
FIG. 6 illustrates integrating the IVD as part of a container retrieval robot in accordance with some embodiments described herein.

FIG. 6 illustrates integrating IVD 100 as part of container retrieval robot 610 in accordance with some embodiments described herein. Robot 610 may include a motorized base 620 on which one or more motors, batteries, processors, wireless radios, sensors, and wheels are mounted. Motorized base 620 powers locomotion or movement of robot 610 in 3D space. In some embodiments, motorized base 620 may include articulating legs, propellers, tracks, or other means of locomotion besides the illustrated wheels.

Atop motorized base 620 is lift 630 that raises and lowers platform 640. As shown, lift 630 may include a collapsing and expanding structure. In some embodiments, lift 630 may include a pneumatic piston or other means for raising and lowering platform 640.

Platform 640 may include an elongated surface onto which containers and other objects retrieved by robot 610 may be retained during transport. Platform 640 may also include a mechanical retriever for retrieving containers and/or other objects onto platform 640. The mechanical retriever may include at least one motor for moving a retrieval element. The retrieval element may include a vacuum that uses suction to engage containers and/or other objects. The retrieval element may alternatively include a gripper, articulating mechanical arm, or other means to grab or otherwise engage containers and/or objects.

In some embodiments, IVD 100 may be integrated into platform 640. In some such embodiments, IVD 100 may verify retrieval of a correct container with correct items as soon as the container is brought onto platform 640 with the retrieval element.

In the event IVD 100 detects a discrepancy associated with the retrieved container, IVD 100 may reroute robot 610 from an original destination to a triage station. Otherwise, robot 610 may deliver the container to the original destination with verification of the container contents.

IVD 100 may be integrated as part of other devices or locations. For instance, IVD 100 may be integrated along a conveyer that moves containers and/or other objects from at least one source location to one or more destination locations. In such instances, IVD 100 automatically verifies inventory and detects inventory discrepancy as containers and/or objects are moved down the conveyer and past IVD 100.

In some embodiments, IVD 100 may be integrated at each order fulfillment station, storage location, and/or other locations where the containers may be temporarily stored. For instance, when integrated at an order fulfillment station, IVD 100 may automatically track and update inventory associated with a container as workers remove items from the container. For instance, IVD 100 may continually measure the weight and/or height of items in a container at the order fulfillment station. As a worker removes an item, IVD 100 may detect the removal based on a deviation in the measured container weight or height. IVD 100 may report the quantity change to IMS 310. IVD 100 may provide an alert or notification to a worker to notify the worker when an ordered quantity of an item has been removed from a container. In this manner, IVD 100 allows the worker to be more efficient as the worker no longer has to stop and scan each item that is removed from the container because IVD 100 automatically detects the removed inventory. IVD 100 also improves worker efficiency and order fulfillment rates by reducing errors associated with workers fulfilling a customer order with too many or too few items.

Similarly, when IVD 100 is integrated at a station where inventory is replenished, IVD 100 may continually measure the weight and/or height of items in a container to ensure that the correct quantity of items is added to the container. IVD 100 may further verify that the container is being replenished or restocked with the correct items by imaging the replenished items and performing feature matching between characteristics of the replenished items and expected characteristics of the correct items. Here again, IVD 100 may provide an alert or notification to a worker to notify the worker when a sufficient quantity of an item has been added to a container, or when an incorrect item is added to the container. In this manner, IVD 100 allows the worker to be more efficient as the worker no longer has to stop and scan each item that is added to the container because IVD 100 automatically detects the added inventory. IVD 100 also improves worker efficiency by reducing errors which in turn reduces the amount of time workers spend correcting errors.

In some embodiments, IVD 100 may be enhanced with a mechanical or robotic picker. With the mechanical picker, IVD 100 may be integrated at a station where items within a container may be manipulated without the need for a separate human or robot to perform the item manipulation tasks.

Figure 7:
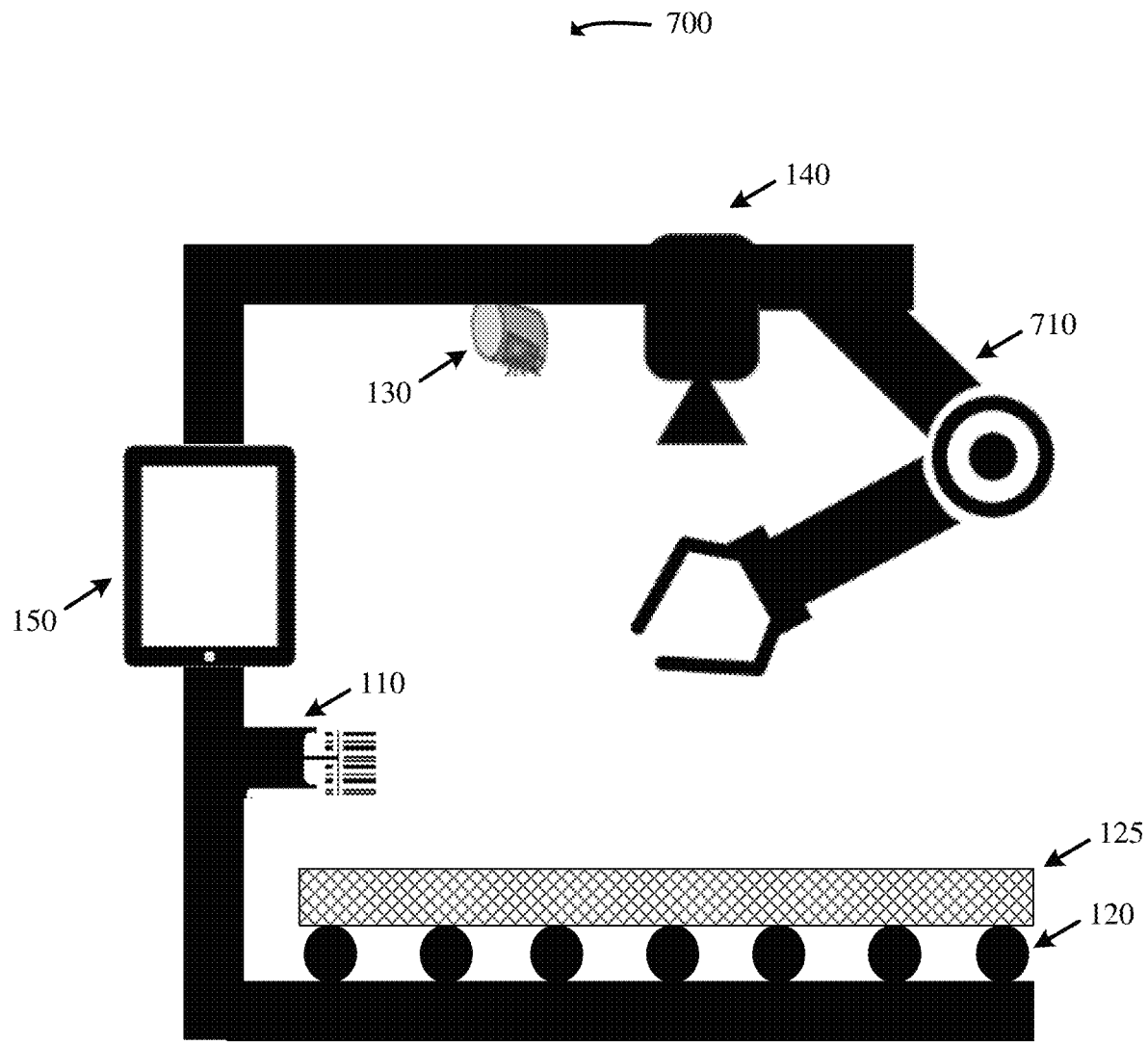
FIG. 7 illustrates an IVD with a mechanical picker in accordance with some embodiments.

FIG. 7 illustrates IVD 700 with mechanical picker 710 in accordance with some embodiments. As with IVD 100, IVD 700 may include sensors 110, 120, 130, and 140, platform 125, and/or display 150. IVD 700 may also include mechanical picker 710. Mechanical picker 710 may be an articulating arm with a gripper, claw, suction, and/or other grasping mechanism at a distal end. One or more actuators about mechanical picker 710 may provide 3D movements, and one or more sensors about the grasping mechanism may regulate the amount of force that is applied on an item being picked by mechanical picker 710.

IVD 700 may be integrated at an order fulfillment station. A robot may retrieve a container containing one or more items of a customer order, and may deliver the container to IVD 700. IVD 700 may use the various sensors 110-140 to verify that the correct container with the correct items has been delivered. IVD 700 may then use the camera of sensor 140 to guide mechanical picker 710 in retrieving one or more items from the container, and in placing the retrieved items as part of the customer order (e.g., in a package or other storage location outside the container). IVD 700 may track each item that is removed from the container, and may provide IMS 310 or other remote system with an updated quantity of the items in the container.

In some embodiments, IVD 100 may also be used to trigger inventory replenishment. For instance, IVD 100 may detect when quantity of a particular item falls below a threshold amount. In this case, IVD 100 may provide messaging to IMS 310 causing IMS 310 to order additional quantities of the particular item. Similarly, IVD 100 can monitor inventory depletion rates. The depletion rate may correspond to the rate at which a particular item is ordered. Based on the detected depletion rate and the remaining quantity of the particular item, IVD 100, in conjunction with IMS 310, may trigger an order to replenish the particular item.

Server, device, and machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
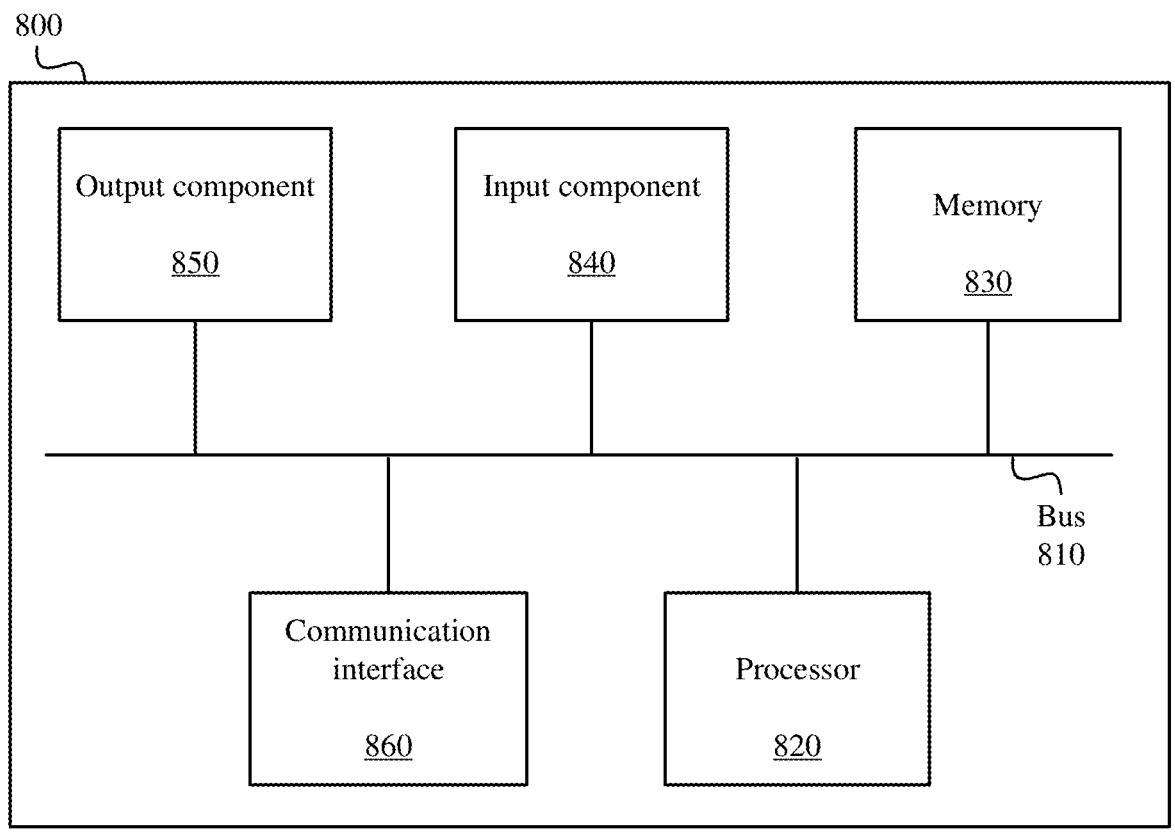
FIG. 8 illustrates example components of one or more devices, according to one or more embodiments described herein.

FIG. 8 is a diagram of example components of device 800. Device 800 may be used to implement certain of the devices described above (e.g., IVD 100, IMS 310, devices carried by human workers, and/or devices integrated as part of the robots). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, WiFi radio, LTE radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A device comprising:
    a platform comprising a flat surface;
    a first sensor integrated under the platform, the first sensor continually measuring a first property of a plurality of items in a container on the platform, wherein the container has an open top side, and wherein the container stores the plurality of items;
    a bracket extended vertically over the platform;
    a second sensor attached towards a top end of the bracket, wherein the second sensor is elevated over the platform by the bracket and is directed downward towards the platform and the open top side of the container, the second sensor continually scanning the plurality of items in the container from the open top side of the container and determining a different second property for the plurality of items in the container based on said continual scanning; and
    a mechanical retrieval element performing one or more actions to manipulate the plurality of items stored in the container based on the first property and the second property, wherein performing the one or more actions comprises:
        removing at least one item of the plurality of items from the container, monitoring a change in the first property output by the first sensor and the second property output by the second sensor after said removing, and repeating said removing and monitoring until a continually updated first property output by the first sensor and a continually updated second property output by the second sensor match an expected quantity of items that is stored for the container; and
        providing a verification message that verifies that the container stores the expected quantity of items in response to one or more of the continually updated first property and the continually updated second property matching the expected quantity after one or more items are removed from the container.

2. The device of claim 1, wherein the mechanical retrieval element is adapted to move across or over the platform.

3. The device of claim 1, wherein performing the one or more actions further comprises removing two or more items from the container based on the expected quantity corresponding to a weight of the container after the two or more items are removed and the first property measuring a weight of the container prior to the two or more items being removed.

4. The device of claim 1, wherein performing the one or more actions further comprises:
    adding at least one item in addition to the plurality of items in the container in response to a quantity of items determined from the first property and the second property being less than the expected quantity of items, wherein said adding comprises tracking insertion of each additional item into the container based on a change to one or more of the first property and the second property, and halting said adding by the mechanical retrieval element in response to the change to the one or more of the first property and the second property eliminating a difference with the expected quantity.

5. The device of claim 1 further comprising:
    one or more processors configured to:
        order additional units of an item stored in the container in response to a quantity that is derived from the first property and the second property.

6. The device of claim 1, wherein the first sensor is a weight sensor, wherein the first property is a weight of the container, wherein the second sensor is an imaging sensor, and wherein the second property corresponds to a quantity determined from visual features of the plurality of items imaged within the container.

7. The device of claim 1, wherein the mechanical retrieval element comprises a vacuum that interacts with the container or the plurality of items in the container using suction.

8. The device of claim 1, wherein the mechanical retrieval element comprises an articulating mechanical arm that interacts with the container or the plurality of items in the container by grabbing the container or individual items in the container.

9. The device of claim 1 further comprising:
    one or more processors configured to:
        verify that the mechanical retrieval element interacts with a correct item based on the first property and the second property corresponding to a correct characteristic of the correct item.

10. The device of claim 1 further comprising:
    one or more processors configured to:
        identify the container based on a first value derived from the first property and the second property;
        control interactions between the mechanical retrieval element and the container until a second value is derived as a result of the first property and the second property changing in response to the interactions.

11. The device of claim 1 further comprising a motorized base and a lift that collectively reposition the platform.

12. The device of claim 1 further comprising a third sensor located above the platform and oriented horizontally towards a front, back, left, or right side of the container while the container is on the platform, wherein the third sensor scans a feature about the front, back, left, or right side of the container, and wherein the device obtains the expected quantity in response to the third sensor scanning the feature.

13. The device of claim 12 further comprising:
    one or more processors configured to:
        determine an inventory discrepancy in response to the expected quantity corresponding to a last tracked quantity of items stored in the container, and the expected quantity differing from one or more quantity values derived from the first property and the second property.

14. A method comprising:
    integrating a first sensor under a platform, the platform comprising a flat surface;
    continually measuring a first property of a plurality of items in a container on the platform using the first sensor, wherein the container has an open top side and that stores the plurality of items;
    elevating a second sensor over the platform with a bracket that extends vertically over the platform and with the second sensor directed downward towards the platform and the open top side of the container;
    determining a different second property for the plurality of items in the container by continually scanning the plurality of items in the container from the open top side of the container using the second sensor;
    controlling interactions that manipulate the plurality of items stored in the container with a mechanical retrieval element based on the first property and the second property, wherein controlling the interactions comprises:
- removing at least one item of the plurality of items from the container with the mechanical retrieval element, monitoring a change in the first property output by the first sensor and the second property output by the second sensor after said removing, and repeating said removing and monitoring until a continually updated first property output by the first sensor and a continually updated second property output by the second sensor match an expected quantity of items that is stored for the container; and
- providing a verification message that verifies that the container stores the expected quantity of items in response to one or more of the continually updated first property and the continually updated second property matching the expected quantity after the at least one item is removed from the container.

15. The method of claim 14, wherein performing the one or more actions further comprises removing two or more items from the container with the mechanical retrieval element based on the expected quantity corresponding to a weight of the container after the two or more items are removed and the first property measuring a weight of the container prior to the two or more items being removed.

16. The method of claim 14 further comprising:
- adding at least one item in addition to the plurality of items in the container in response to a quantity of items determined from the first property and the second property being less than the expected quantity of items, wherein said adding comprises tracking insertion of each item into the container based on a change to one or more of the first property and the second property, and halting said adding by the mechanical retrieval element in response to the change to one or more of the first property and the second property eliminating a difference with the expected quantity.

17. A device comprising:
- a platform comprising a flat surface;
- a first sensor integrated under the platform, the first sensor continuously measuring a first property of a plurality of items in a container on the platform, wherein the container has an open top side, and wherein the container stores the plurality of items;
- a bracket extended vertically over the platform;
- a second sensor attached towards a top end of the bracket, wherein the second sensor is elevated over the platform and the open top side of the container by the bracket and is directed downward towards the platform, the second sensor continually scanning the plurality of items in the container from the open top side of the container and determining a different second property for the plurality of items in the container based on said continual scanning; and
- a mechanical retrieval element performing one or more actions to manipulate the plurality of items stored in the container based on the first property and the second property, wherein performing the one or more actions comprises removing a particular item of the plurality of items from the container in response to the second property scanned for the particular item deviating from the second property scanned for other items of the plurality of items.

* * * * *